(No Model.)
W. P. CANNING.
BELT SHIPPING DEVICE.
No. 484,407. Patented Oct. 18, 1892.
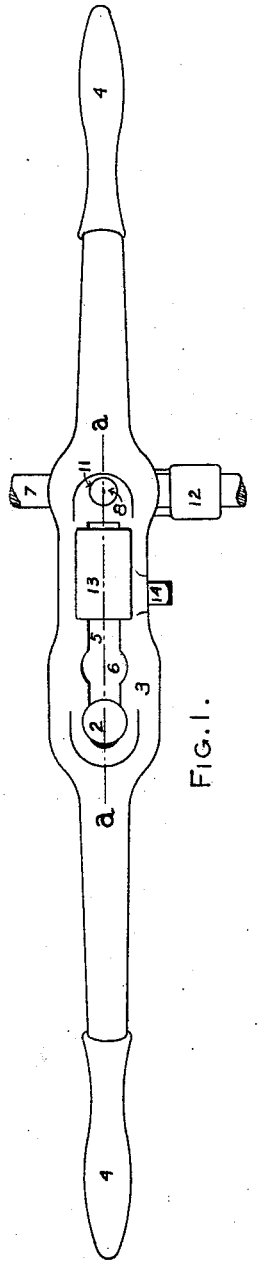
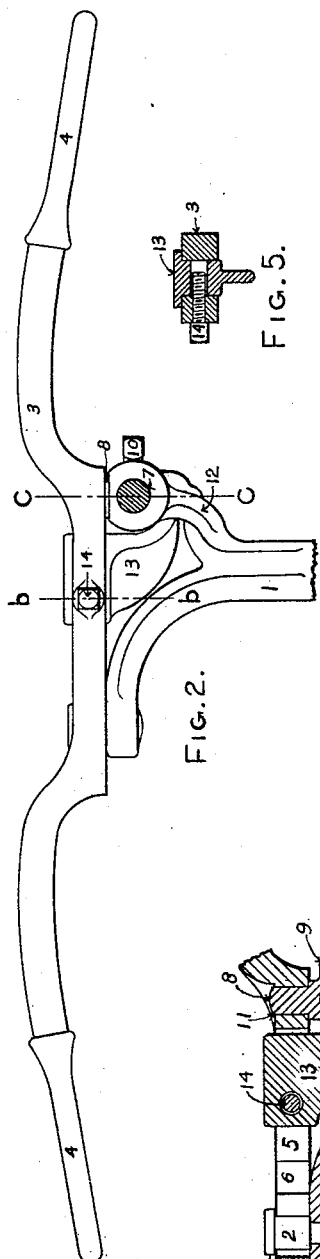
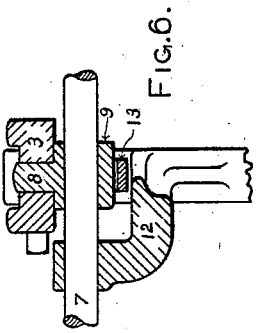
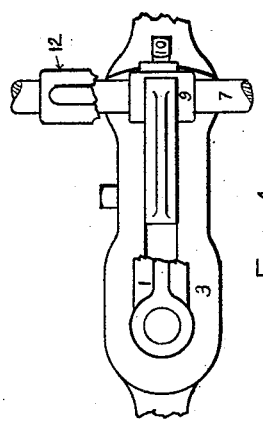
WITNESSES
INVENTOR
William Pitt Canning
By Chas. F. Randall
His Attorney

UNITED STATES PATENT OFFICE.

WILLIAM PITT CANNING, OF LOWELL, MASSACHUSETTS, ASSIGNOR TO THE LOWELL MACHINE SHOP, OF SAME PLACE.

BELT-SHIPPING DEVICE.

SPECIFICATION forming part of Letters Patent No. 484,407, dated October 18, 1892.

Application filed July 1, 1892. Serial No. 438,729. (No model.)

*To all whom it may concern:*

Be it known that I, WILLIAM PITT CANNING, a citizen of the United States, residing at Lowell, in the county of Middlesex and Commonwealth of Massachusetts, have invented a certain new and useful Improvement in Belt-Shipping Devices, of which the following is a specification, reference being had therein to the accompanying drawings.

My invention relates to the devices which are employed in machines for placing the parts thereof in and out of connection with the driving-power—as, for example, belt-shipping devices.

My invention consists in an improved construction and combination of parts pertaining to a set of shipping devices, and will first be described in the following specification, and then be particularly pointed out and defined in the claims at the close thereof.

In the accompanying drawings, Figure 1 is a view, in plan, of devices embodying my present invention. Fig. 2 is a view, mainly in side elevation, of the devices represented in Fig. 1, the shipper-rod being in section. Fig. 3 is a view in vertical section on the line $a$ $a$ in Fig. 1. Fig. 4 is an inverted view of the parts shown in the preceding figures, the ends of the shipper-handle and part of the supporting-stand being broken away. Fig. 5 is a view in vertical section on the line $b$ $b$ in Fig. 2. Fig. 6 is a view in vertical section on the line $c$ $c$ in Fig. 2.

At 1 is shown the upper portion of a supporting-stand, which is intended to be suitably mounted and secured in place upon the framing of the machine to which are applied the shipping devices embodying my present invention, or the said stand may be otherwise placed where required.

2 is a stud carried by the said stand, and 3 is the shipper-handle having grasping portions 4 at one end or both ends thereof and mounted upon said stand 1, to which it is held by stud 2. The said stud passes through a slot 5 in the shipper-handle, and the flange or head at the free end thereof serves to retain the shipper-handle from rising and passing off the same. The slot 5 is of considerable length, and a part thereof toward the mid-length of the slot is enlarged, as at 6, this part 6 being of sufficiently-great size to permit the head of the stud 2 to pass readily therethrough, thus enabling the shipper-handle to be mounted upon the stud 2 or removed therefrom. When the parts are properly assembled, the stem of the stud 2 extends through the narrower portion of the slot 5 at one side of the enlargement 6, and the shipper-handle is free to swing around the said stud or to slide to a slight extent in the direction of its length without being dismounted.

At 7 is shown the shipper-rod, the same carrying a projecting pin 8, which in this instance forms part of the collar 9, that is held in place upon the shipper-rod by the screw 10. The said pin enters a hole 11, which is formed in the shipper-handle a short distance in advance of one end of the slot 5, the said pin serving as a means for connecting together the shipper-handle and shipper-rod. The shipper-rod 7 is supported by a bearing formed in an arm 12, projecting from the stand 1. As will be obvious, the shipper-handle may be swung in either direction around the stud 2 for the purpose of moving the shipper-rod endwise. For the purpose of preventing the shipper-handle from being by accident forced vertically off the pin 8, I provide the shipper-handle with a snug or retainer 13, which is carried thereby and has a portion extending under the shipper-rod, as clearly shown in the drawings, to prevent the shipper-handle being raised. The body of the said snug or retainer is fitted in the slot 5 on the side of the enlargement 6, which is opposite to that on which the stud 2 is placed in the said slot, the said body having flanges, as shown, which rest upon the upper surface of the shipper-handle at the sides of the slot. (See, particularly, Fig. 5.) A screw 14 passes through a threaded hole in the shipper-handle on one side of the slot and enters the body of the snug or retainer, thereby holding the latter in the slot. (See Fig. 5.)

In assembling the parts the collar 9, with its projecting pin 8, is slipped upon the shipper-rod, the screw 10 not being turned to secure the collar in place. The snug or retainer being absent from the slot 5, the shipper-handle is so held over the stand 1 as to bring the enlargement 6 over the head of the stud 2.

Then the shipper-handle is slipped down over the stud and moved endwise, so as to draw the narrow portion of the slot, which is at the left in Figs. 1 and 3, around the stem of the stud 2. The right-hand end of the shipper-handle is now canted upward slightly, this being permitted by the play which is allowed to occur between the parts at the left in Fig. 3, whereupon the collar 9 is turned so as to present the projecting pin 8 in proper position beneath the hole 11, the right-hand end of the shipper-handle then being lowered, so as to cause the pin 8 to enter the said hole. The screw 10 is turned in, so as to cause its end to bear against the shipper-rod, and the devices then are ready for operation after the snug or retainer 13 has been placed in proper position in the slot 5 and secured by the screw 14.

When it is desired to remove the shipper-handle, the snug or retainer 13 is released and removed, the collar 9 is loosened from the shipper-rod, the right-hand end of the shipper-handle is canted upward slightly to disengage the shipper-handle from the pin 8, the shipper-handle is moved endwise until the stud 2 is within the enlargement 6, and then the shipper-handle is lifted and removed.

I claim as my invention—

1. The combination, with a shipper-rod provided with a projection, of a shipper-handle having a hole to receive the said projection, and also a slot, a stud passing through the said slot and on which the said shipper-handle may both slide and turn, and a snug or retainer carried by the shipper-handle and extending under the shipper-rod to prevent the shipper-handle from being raised, substantially as described.

2. The combination, with a shipper-rod provided with a projection, of a shipper-handle having a hole to receive the said projection, and also a slot extending longitudinally thereof, a stud passing through the said slot and on which the said shipper-handle may both slide and turn, a snug or retainer fitted in a portion of the said slot in the shipper-handle and extending under the shipper-rod to prevent the shipper-handle from being raised, and a screw for holding the snug or retainer in place in the slot, substantially as described.

In testimony whereof I affix my signature in presence of two witnesses.

WILLIAM PITT CANNING.

Witnesses:
SAML. G. STEPHENS,
CHANNING WHITAKER.